United States Patent [19]
Nishino et al.

[11] Patent Number: 5,787,376
[45] Date of Patent: Jul. 28, 1998

[54] POWER STEERING MOTOR CONTROL UNIT WITH DRIVING MODE CORRECTION

[75] Inventors: Kazuhisa Nishino; Masaya Ushio, both of Kobe; Shunichi Wada, Tokyo, all of Japan

[73] Assignee: Mitsubishi Denki Kabushiki Kaisha, Tokyo, Japan

[21] Appl. No.: 581,208

[22] Filed: Dec. 29, 1995

[30] Foreign Application Priority Data

Sep. 1, 1995 [JP] Japan ................................. 7-225424

[51] Int. Cl.[6] ........................................................ B62D 5/04
[52] U.S. Cl. .............................. 701/41; 701/42; 701/43; 180/446; 180/443; 388/811; 388/819
[58] Field of Search ................... 364/424.051, 424.052, 364/424.053; 388/815, 811, 819; 318/254, 432, 434, 266, 282, 286; 180/446, 443

[56] References Cited

U.S. PATENT DOCUMENTS

| | | | |
|---|---|---|---|
| 4,896,735 | 1/1990 | Morishita et al. | 180/446 |
| 4,972,133 | 11/1990 | Hirota et al. | |
| 5,150,021 | 9/1992 | Kamono et al. | 318/488 |
| 5,201,818 | 4/1993 | Nishimoto | 180/446 |
| 5,404,960 | 4/1995 | Wada et al. | 364/424.051 |
| 5,530,788 | 6/1996 | Saijima | 318/434 |
| 5,569,991 | 10/1996 | Matsuoka et al. | 318/286 |
| 5,574,344 | 11/1996 | Matsuoka et al. | 318/293 |
| 5,631,529 | 5/1997 | Shimizu et al. | 180/446 |

FOREIGN PATENT DOCUMENTS 6-292389   10/1994   Japan .

OTHER PUBLICATIONS

Patent Abstracts of Japan, vol. 94, No. 010, Omron corp. Oct. 18, 1994 (JP6292389).

*Primary Examiner*—Tan Q. Nguyen
*Attorney, Agent, or Firm*—Sughrue, Mion, Zinn, Macpeak & Seas, PLLC

[57] ABSTRACT

A power steering motor control unit for driving a motor in a PWM mode with feedback motor current control reduces fluctuations in the output torque of the motor caused by switching among a plurality of motor driving modes or a change in the duty value of the PWM signal. The control unit as a switching device driving circuit for driving the motor in the PWM mode and a plurality of motor driving modes for the driving control system of a motor, Q/D switching circuitry 14 for switching the motor driving mode, and detected current correcting circuitry 16 for correcting at least one input signal of an input signal comparing circuit provided in a feedback control loop in accordance with the motor driving mode. When the motor driving mode is switched, the correction value given by the detected current correcting circuitry is changed.

6 Claims, 18 Drawing Sheets

1

POWER STEERING MOTOR CONTROL UNIT WITH DRIVING MODE CORRECTION

BACKGROUND OF THE INVENTION

1. Field of the Invention

The present invention relates to a motor control unit which has a plurality of motor driving modes for the drive control system of a motor and which switches the motor driving mode to control a motor and, more particularly, to an electric power steering control unit designed to provide the steering system of a vehicle with additional power by a motor.

2. Description of the Related Art

A conventional motor control unit has been disclosed, for example, in Japanese Patent Laid-Open No. 6-292389. The prior art is intended to control the increase in the dead zone in motor current simply by correcting the nonlinear portion of the motor current detected through a current detector. Most current detectors for detecting motor current are designed so that they do not incur fluctuations in the detection signal level. In actual use, however, the signal level changes according also to the duty ratio of a pulse width modulation (PWM) signal for driving a motor and the linearity of the current detector also changes according to the driving mode of the motor. This presented problems including the one in that the actual motor current varies in steps when the motor driving mode is switched or other similar operation is performed and therefore the electric power steering control unit or the like which employs the prior art stated above develops a shock to a steering wheel during the power steering operation.

The following describes an electric power steering control unit which provides power for aiding the steering of a vehicular steering wheel. The electric power steering control unit is an example of a conventional control unit which has a plurality of motor driving modes and which controls a motor by switching the motor driving mode.

FIG. 15 is a block diagram showing a schematic configuration of the conventional electric power steering control unit. In the drawing, currents are supplied from a battery 1 to a motor 3, which provides a steering mechanism (not shown) with aiding power, via switching devices 2a through 2d. The motor current supplied from the battery 1 to the motor 3 is detected by a shunt resistor 4. A current detecting circuit 5 detects the motor current from the shunt voltage generated at the shunt resistor 4 in accordance with the motor current and outputs a detected current value. A torque sensor 6 detects a steering torque applied by a driver to the steering mechanism and issues a torque signal which indicates the detected steering torque. A vehicular speed sensor 7 detects the vehicular speed and issues a vehicular speed signal which indicates the detected vehicular speed. The outputs of the torque sensor 6 and the vehicular sensor 7 are applied to a target motor current deciding means 8 which decides the target value of the currents to be supplied to the motor 3 in accordance with the torque value and the vehicular speed value. The output of the torque sensor 6 is applied also to a motor driving direction deciding means 9 which decides the motor driving direction. The output of the target motor current deciding means 8 and the output of the current detecting circuit 5 are supplied to an input signal comparing means 17 which compares the detected current value and the target current value to determine the difference between the two values. The output of the input signal comparing means 17 is applied to a PWM signal converting means 10 which determines a duty value in accordance with the determined difference and the duty value is converted into a PWM signal.

The voltage across the motor 3 is detected by a motor terminal voltage detector circuit 11, an output of which as well as the output of the current detecting circuit 5 is applied to a motor rpm estimating means 12 which estimates the number of revolutions of the motor from the motor terminal voltage and the detected current value. The output of the motor rpm estimating means 12 as well as the output of the torque sensor 6 are supplied to an inward/outward steering determining means 13 which determines whether the steering wheel is being turned inward (turned from a certain angle back to a neutral point) or outward (turned away from the neutral point) according to the motor rpm and the torque value. The output of the inward/outward steering determining means 13 is handed to a Q/D switching means 14. The Q/D switching means 14 issues a signal of a driving mode (hereinafter referred to as "Q mode") wherein the motor is run with the switching devices 2a, 2d operated in the PWM drive mode and the switching devices 2b, 2c OFF if the determination result of the inward/outward steering determining means 13 indicates that the steering wheel is being steered back; or it issues a signal of a driving mode (hereinafter referred to simply as "D mode") wherein the motor is run with the switching device 2a operated in the PWM mode, the switching device 2d fixed to ON, and the switching devices 2b, 2c OFF if the determination result of the inward/outward steering determining means 13 indicates that the steering wheel is being turned inward. A switching device driving circuit 15 receives the PWM signal from the PWM signal converting means 10, the output signal from the motor driving direction deciding means 9, and the Q/D mode signal from the Q/D switching means 14 and it drives the switching devices 2a through 2d in accordance with the received signals. The target motor current deciding means 8, the motor driving direction deciding means 9, the PWM signal converting means 10, the motor rpm estimating means 12, the inward/outward steering determining means 13, the Q/D switching means 14, the input signal comparing means 17, etc. shown in FIG. 15 are configured in terms of software such as a program executed by a CPU 20D in order to control the currents supplied to the electric power steering device.

Further, the configuration of the current detecting circuit 5 is shown in FIG. 16. In the drawing, a switch 5a turns ON/OFF in response to a PWM signal from the CPU and it synchronizes with the ON/OFF timing of the switching devices 2a, 2d. When the switching devices 2a, 2d are turned ON, the switch 5a also turns ON to charge a capacitor 5c with the shunt voltage generated at the shunt resistor 4. When the switch 5a is turned OFF, the voltage charged in the capacitor 5c is discharged via a resistor 5b. An operational amplifier 5d amplifies the voltage accumulated in the capacitor 5c and outputs the result as the detected current value. The constants of the resistor 5b and the capacitor 5c are adjusted in advance so that a detected current waveform approximates the motor current waveform of the motor 3.

The conventional electric power steering control unit stated above, however, has the problems set forth below.

FIG. 17 and FIG. 18 show the motor currents observed when the electric power steering control unit of FIG. 15 is in the Q and D modes, respectively.

FIG. 17 shows the flow of the motor current in the D mode wherein the switching device 2a is driven in the PWM mode, the switching device 2d is ON, and the switching devices 2b and 2c are OFF. When the switching device 2a is ON, the motor current flows from the battery 1 to the motor 3, the switching device 2d, and the shunt resistor 4 via the switching device 2a in the order in which they are listed (as indicated by route (a) shown in FIG. 17). When the switching device 2a is OFF, the regenerative current of the motor 3 flows through the motor 3, the switching device 2d, the switching device 2c (an internal parasitic diode), and the motor 3 in the order in which they are listed (as indicated by route (b) in FIG. 17).

FIG. 18 shows the motor current flow observed in the Q mode wherein the switching devices 2a and 2d are PWM-driven and the switching devices 2b and 2c are OFF. When the switching devices 2a and 2d are ON, the motor current flows along the same route as that shown in FIG. 17 (as indicated by route (a) in FIG. 18). When the switching devices 2a and 2d are OFF, the regenerative current of the motor 3 flows through the shunt resistor 4, the switching device 2c (the internal parasitic diode), the motor 3, and the switching device 2b (an internal parasitic diode) in the order in which they are listed (as indicated by route (b) in FIG. 18).

Thus, the route of the motor current flow changes according to the motor driving mode which is set; therefore, the waveform of the shunt voltage changes and the value of the current detected by the current detecting circuit 5 in relation to the duty ratio accordingly changes.

FIG. 19 shows the characteristics of the motor current of the electric power steering control unit of FIG. 15. In FIG. 19, (1) indicates the motor current characteristic of the PWM signal in relation to duty ratio; (a) denotes the characteristic exhibited in the D mode and (b) denotes the characteristic exhibited in the Q mode; (2) indicates the motor current characteristic in relation to detected current values.

For instance, from FIG. 19, when the electric power steering control unit of FIG. 15 is in a state where the motor driving mode is D, the duty ratio is DY1, the motor current is I1, and the detected current value is S1, if the Q/D switching means 14 issues the Q mode signal in response to a detection result of the inward/outward steering determining means 13, then the switching device driving circuit 15 switches the motor driving mode from D to Q. However, since the duty ratio of the PWM signal is DY1, the motor current changes to I2. The detected current value changes to S2 according to the new motor current and when a difference is produced between the detected current value and the target current value, the CPU 20 carries out motor current control, resulting in further change in the motor current.

Thus, the switching of the motor driving mode causes a change in the motor current, presenting a problem in that a change in the output torque of the motor 3 develops into a shock to a steering system.

Furthermore, in the current detecting circuit 5 of FIG. 16, the constants of the resistor 5b and the capacitor 5c are adjusted beforehand so as to produce a waveform which approximates that of the motor current. Such adjustment is performed with the number of revolutions of the motor, the battery voltage, etc. set for predetermined values. In actual operation, however, the motor 3 is running and the voltage across the motor changes due to the motor-generated voltage; therefore, keeping a predetermined motor current requires that the duty ratio of the PWM signal be changed. This means that even if the motor current level remains unchanged, a change in the duty ratio inevitably changes the effective value of the approximate waveform of the motor current based on the resistor 5b and the capacitor 5c in the current detecting circuit 5, thus leading to a current detection error.

For instance, FIG. 20 shows a duty characteristic in relation to motor current for different numbers of revolutions of the motor; (a), (b), and (c) indicates a state where the steering wheel is turned inward, a state where the steering wheel is locked, and a state where the steering wheel is turned back, respectively. Referring to the drawing, in an attempt to let the same motor current flow in the states (a), (b), and (c), when an initial adjustment of the constants of a resistor 5b and a capacitor 5c in the motor state (b) is performed in the current detecting circuit 5, for example, the charging and discharging time of the resistor 5b and the capacitor 5c are different between the motor states (a) and (c) and the detected waveforms significantly differ from the motor current waveform since the duty ratio of the PWM signal differs according to the motor state. The same phenomenon occurs when the line voltage of the battery 1 changes.

Thus, since the detected waveforms vary even at the same motor current, the detected current values unavoidably incur errors depending on the condition of the motor revolution.

SUMMARY OF THE INVENTION

Accordingly, the present invention has been developed with a view toward solving the problems with the conventional unit stated above and it is an object of the present invention to provide a motor control unit which is capable of reducing the fluctuations in motor torque caused by the switching of the motor driving mode.

It is another object of the present invention to provide a motor control unit which is capable of performing highly accurate correction by correcting at least one current input signal in a feedback control loop in accordance with a PWM drive duty value and also capable of reducing motor current detection errors even if the duty ratio changes due to a change in a motor revolution state or battery voltage.

It is still another object of the present invention to provide a motor control unit which permits easier setting and updating of a correction value than that done by arithmetic processing even if the correction values for current input signals are nonlinear, making it possible to further control the fluctuations in motor current.

According to one aspect of the present invention, a motor control unit, which drives a motor in a PWM mode and controls the motor current by feedback, is equipped with driving means for PWM-driving the motor, motor driving mode switching means which has a plurality of motor driving modes for the driving control system of the motor and switches the motor driving mode, and input signal correcting means for correcting at least one input signal of comparing means provided in a feedback control loop in accordance with the motor driving mode; and it is designed to change the correction value given by the input signal correcting means whenever the motor driving mode is changed.

According to another aspect of the present invention, a motor control unit, which drives the motor in the PWM mode and controls the motor current by feedback, is equipped with driving means for PWM-driving the motor and input signal correcting means for correcting at least one input signal of the comparing means provided in the feedback control loop in accordance with the duty value of the PWM drive.

In a preferred form, the motor control unit is further equipped with correction value storing means for storing beforehand the correction values used by the input signal correcting means; the input signal correcting means performs correction by using the correction values stored in the correction value storing means.

According to a further aspect of the present invention, the motor control unit, which drives the motor in the PWM mode and controls the motor current by feedback, has the driving means for PWM-driving the motor, the motor driving mode switching means which has a plurality of motor driving modes for the driving control system of the motor and which switches the motor driving mode. The motor driving mode switching means alternately switches between the two driving modes for a predetermined time when it switches the motor driving mode.

In another preferred form, the motor control unit is designed to repeatedly turn ON/OFF the corrective processing implemented by the input correcting means for a predetermined time when the motor driving mode is switched by the motor driving mode switching means.

In a further preferred form, when the motor driving mode switching means changes the motor driving mode, the input signal correcting means is switched and the correction amount of the input signal correcting means is decreased as time elapses.

DESCRIPTION OF THE PREFERRED EMBODIMENTS

The preferred embodiments of the present invention will now be described with reference to the accompanying drawings.

Figure 1:
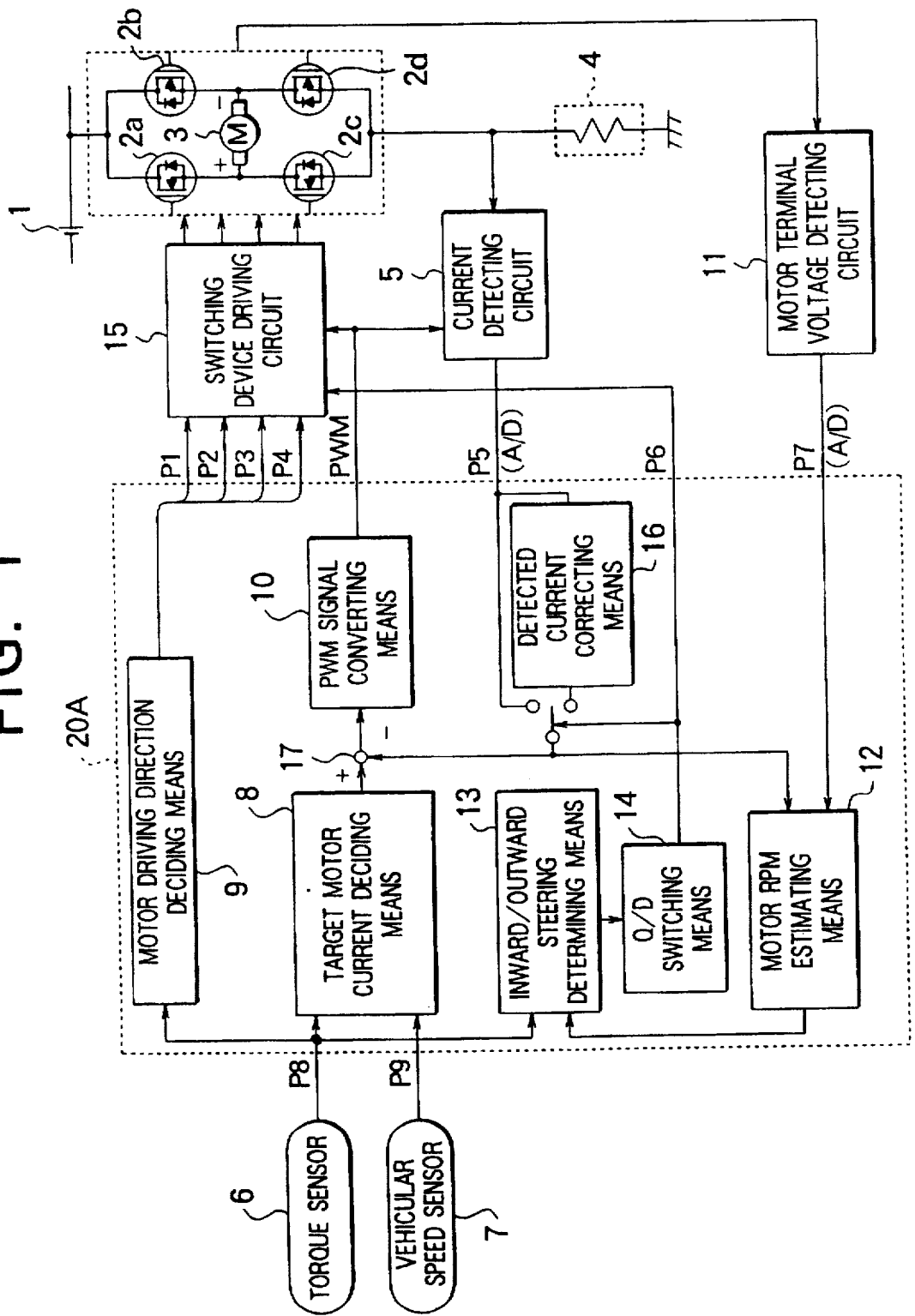
FIG. 1 is a block diagram illustrative of the configuration of an electric power steering control unit of a first embodiment according to the present invention.

First Embodiment:

The first embodiment wherein the present invention is applied to an electric power steering control unit will be described. FIG. 1 is the block diagram showing the schematic configuration of the electric power steering control unit according to the first embodiment.

In the drawing, the electric power steering control unit of the embodiment includes: the battery 1 serving as the power supply; switching devices 2a through 2d; the motor 3; the shunt resistor 4 for detecting motor currents; the current detecting circuit 5 for detecting motor current from the shunt voltage of the shunt resistor 4 and issuing a detected current value; detected current correcting means 16 for correcting a detected current value only when the motor driving mode is Q; the torque sensor 6 which detects a steering torque of a steering system and issues a torque signal indicating the detected torque; the vehicular speed sensor 7 which detects vehicular speed and issues a vehicular speed signal; the target motor current deciding means 8 which decides a target current value in accordance with the torque value of the torque sensor 6 and the vehicular speed value of the vehicular speed sensor 7; the motor driving direction deciding means 9 which decides the motor driving direction according to the torque value; the input signal comparing means 17 which compares the detected current value with the target current value to determine the difference between the two values; and the PWM signal converting means 10 which determines a duty value from the difference determined by the input signal comparing means 17 and converts it into a PWM signal.

The output of the current detecting circuit 5 is divided into two; one is applied to the detected current correcting means 16 and the other is supplied directly to the input signal comparing means 17. In other words, the output of the current detecting circuit 5 and the output of the detected current correcting means 16 are selectively supplied to the input signal comparing means 17 in accordance with the output of the Q/D switching means 14.

The electric power steering control unit further includes a motor terminal voltage detector circuit 11 which detects the voltage across the motor 3; the motor rpm estimating means 12 which estimates the number of revolutions of the motor from the motor terminal voltage received from the motor terminal voltage detector circuit 11 and the detected current value; the inward/outward steering determining means 13 which determines whether the steering wheel is being turned outward or inward according to the motor rpm determined by the motor rpm estimating means 12 and the torque value of the torque sensor 6; the Q/D switching means 14 which issues the Q mode signal if the determination result of the inward/outward steering determining means 13 indicates that the steering wheel is being turned outward or the D mode signal if the determination result indicates that the steering wheel is being turned inward; and a switching device driving circuit 15 which receives the Q or D mode signal from the Q/D switching means 14 and drives the switching devices. The components 8 through 10, 12 through 14, and 16 constitute a control unit 20A which controls the currents supplied to the electric power steering control unit. In this case, the control unit 20A may be configured in terms of software to implement a control program executed by a CPU or in terms of hardware using electric circuits or the like.

The Q/D switching means 14 constitutes a motor driving mode switching means according to the present invention for switching the driving mode of the motor 3; the switching device driving circuit 15 constitutes the driving means according to the present invention for driving the motor 3 in the PWM drive mode; the detected current correcting means 16 constitutes the input signal correcting means for correcting at least one input signal of the comparing means provided in the feedback control loop in accordance with the motor driving mode; and the input signal comparing means 17 constitutes the comparing means according to the present invention which is provided in the feedback control loop.

The circuit constant of the current detecting circuit 5 is adjusted at a predetermined battery voltage, with the motor locked and the D mode as the reference drive mode.

Figure 2:
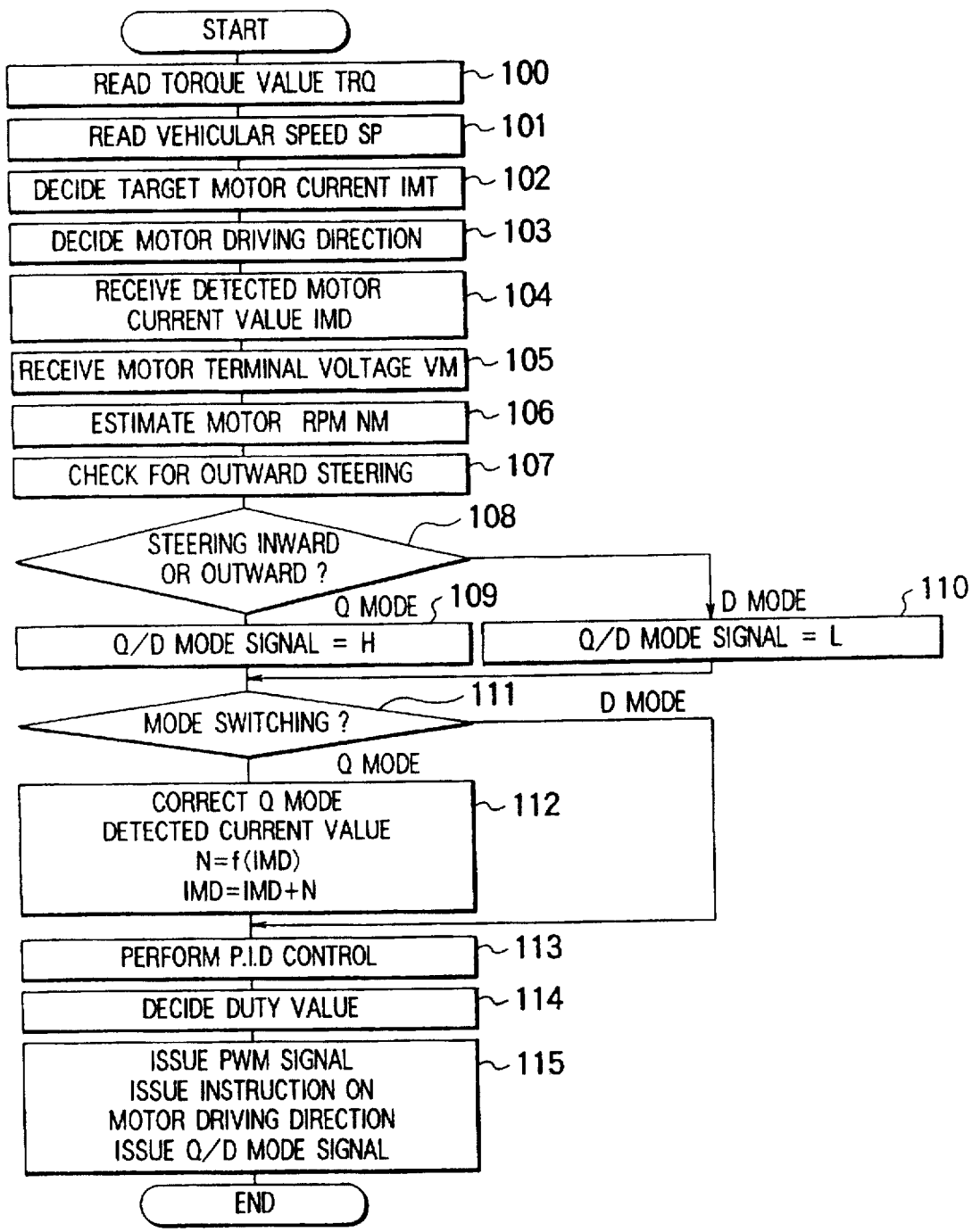
FIG. 2 is a flowchart illustrative of the operation of the control unit according to the first embodiment.

The operation of the current control of the control unit 20A will be described in conjunction with the flowchart of FIG. 2. First, the steering torque of the steering system which has been generated by driver's steering is detected by the torque sensor 6 and a torque value TRQ is read in (step 100), then a vehicular speed SP is read from the vehicular sensor 7 (step 101). A target motor current value IMT is decided by the target motor current deciding means 8 from the torque value TRQ and the vehicular speed SP (step 102), and the driving direction of the motor 3 is decided in accordance with the torque value TRQ (step 103). Then in a step 104, a detected current value IMD is received from the current detecting circuit 5; in a step 105, a motor terminal voltage VM is received from the motor terminal voltage detector circuit 11; and the number of revolutions NM of the motor 3 is estimated from the motor terminal voltage VM and the detected current value IMD (step 106). The state of the driving wheel is estimated from the number of revolutions of the motor NM and the torque value TRQ (step 107) to determine whether the steering wheel is being turned outward or not (step 108). If it is found that the steering wheel is being turned outward, then the Q/D mode signal is set for the high level (H) (step 109) or if it is found that the steering wheel is being turned inward, then the Q/D mode signal is set for the low level (L) (step 110). Next, it is determined whether the Q/D mode has been switched or not (step 111) and if the Q/D mode signal has switched from L to H, that is, if the mode has been changed from D to Q, then a predetermined correction value N is determined in accordance with the detected current value IMD, and the correction value N is added to the detected current value IMD to adjust it to the predetermined detected current value IMD (step 112). If the Q/D mode signal switches from H to L, which means the shift from the Q mode to the D mode, then the detected current value IMD is left uncorrected. In the subsequent step, P.I.D. control is carried out so that the difference between the target current value IMT and the detected current value IMD becomes zero (step 113), the duty value is decided (step 114), and the duty value is converted into a PWM signal. Lastly, the PWM signal, the motor driving direction decided in step 103, and the Q/D mode signal are output (step 115).

Thus, the motor control unit which has a plurality of motor driving modes to suit each motor driving control system is capable of changing the correction value by switching the mode of the detected current correcting means 16, which serves as the input signal correcting means, whenever the motor driving mode is changed. This enables the motor control unit to reduce sudden changes in the motor current caused by the switching among a plurality of motor driving modes and to eliminate a change (or shock) in the motor torque which is generated when the motor driving mode is changed.

In the embodiment described above, the object to be corrected by the detected current correcting means 16 may be a target current value as long as it is an input signal supplied to the input signal comparing means 17 serving as the comparing means.

Further, an object of the present invention is to reduce the motor current fluctuations caused by switching among the motor driving modes, the detected current correcting means 16 need not be provided for each motor driving mode; it may provided only for one motor driving mode as in the embodiment stated above.

The means for limiting the value after correction is provided immediately after the input signal correcting means, thereby preventing the value to be corrected from going out of a predetermined control range after it is corrected.

Figure 3:
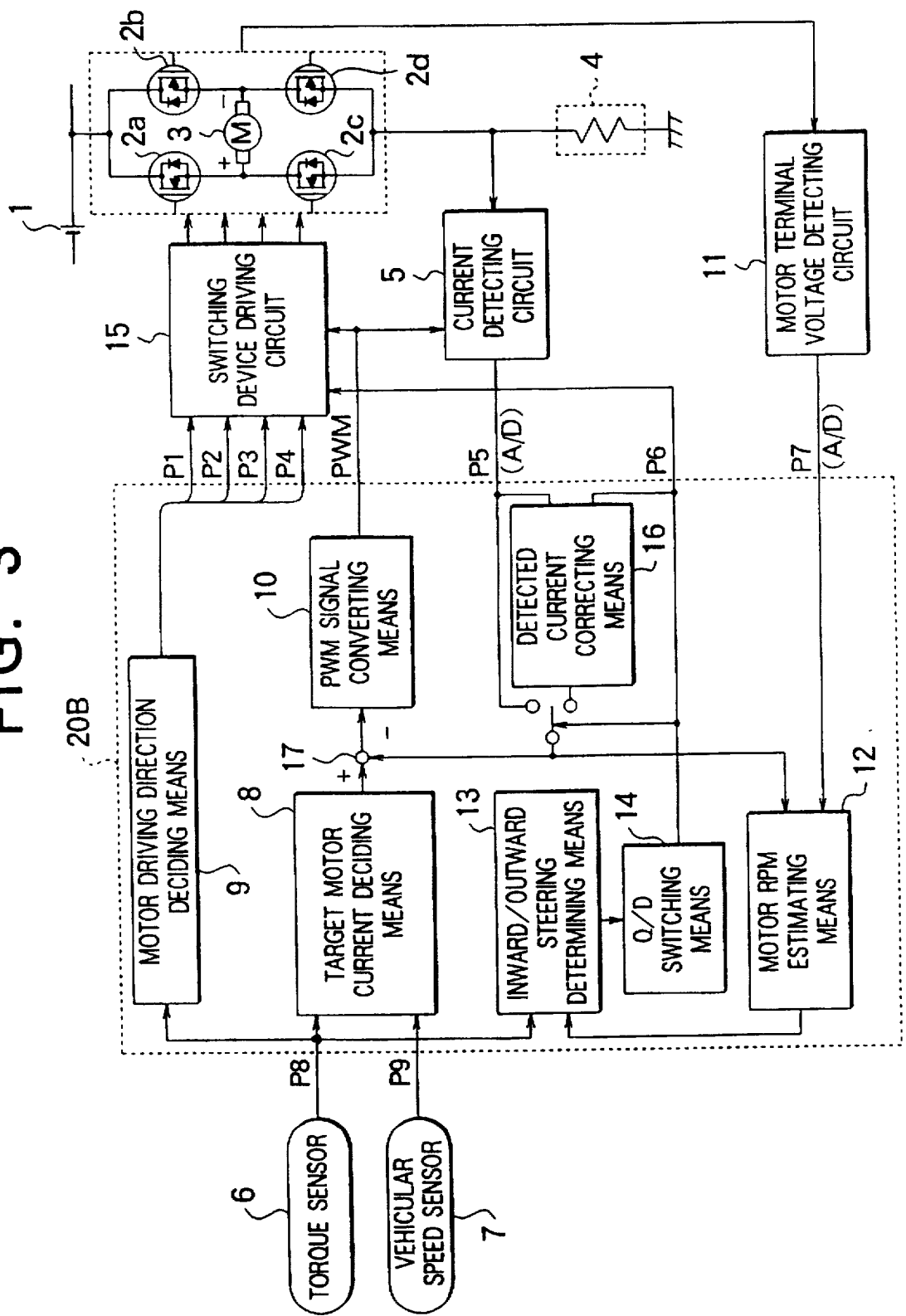
FIG. 3 is a block diagram illustrative of the configuration of an electric power steering control unit of a second embodiment according to the present invention.
Figure 4:
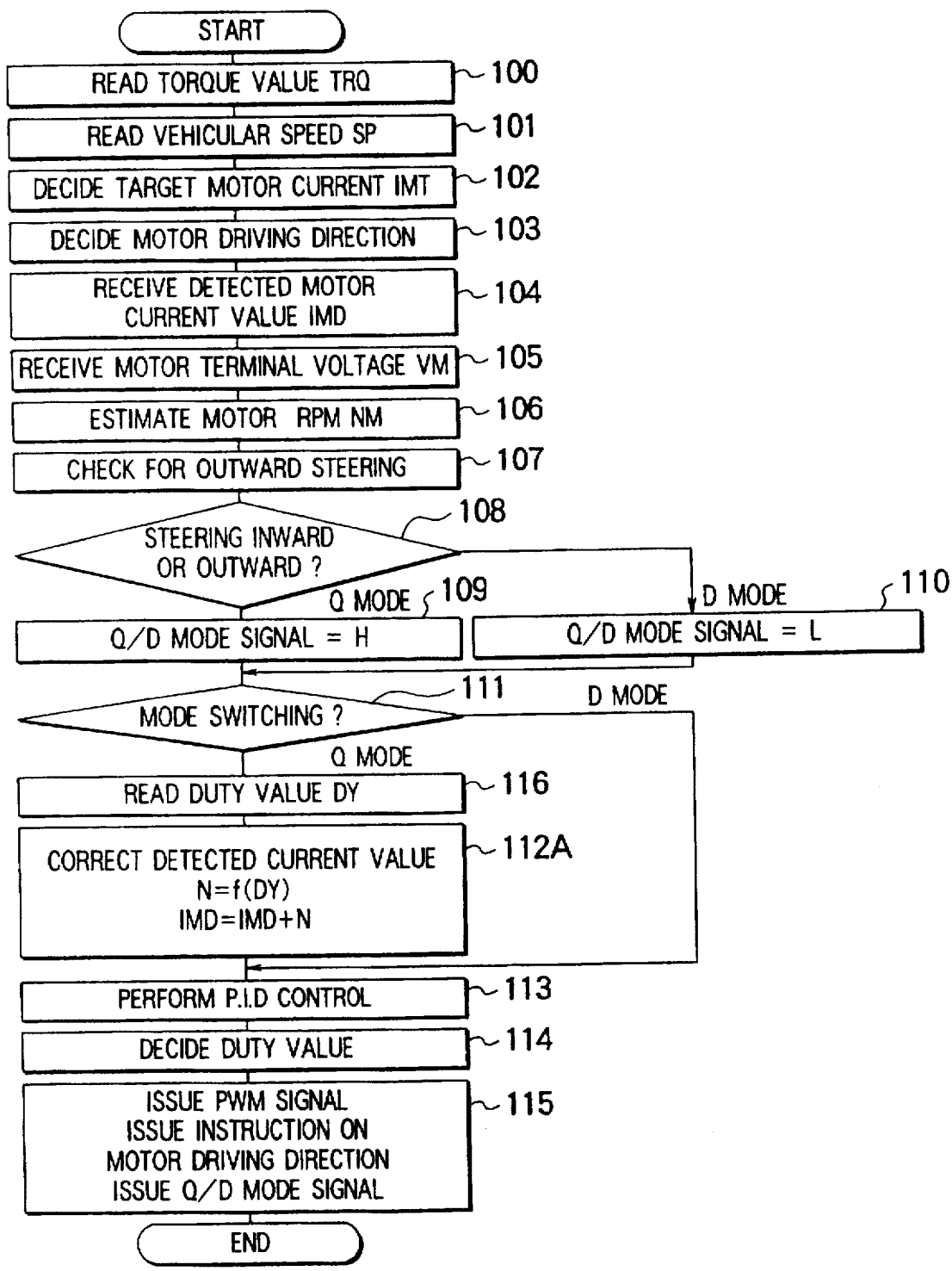
FIG. 4 is a flowchart illustrative of the operation of the control unit according to the second embodiment.

Second Embodiment:

FIG. 3 shows the configuration of the electric power steering control unit according to the second embodiment of the present invention; FIG. 4 is the flowchart showing the operation of the second embodiment. This embodiment is designed so that the output value (duty value) of the PWM signal converting means 10 is supplied to the Q mode detected current correcting means 16 of the first embodiment shown in FIG. 1 in order to add a corrected amount to the detected current value in accordance with the duty value in the Q mode. The rest of the configuration of the second embodiment is the same as that shown in FIG. 1 and the detailed description thereof will be omitted.

The current control operation of the control unit 20B of the second embodiment will be described with reference to the flowchart shown in FIG. 4. In FIG. 4, the steps up to a step 111 are the same as those of the first embodiment and the description thereof will be omitted. First, when the Q/D mode signal switches from L to H, i.e. when the D mode is changed to the Q mode, a duty value DY is received from the PWM signal converting means 10 (step 116), the predetermined correction value N is determined according to the duty value DY, the determined correction value N is added to the detected current value IMD, and the correction is made to obtain the predetermined detected current value IMD (step 112A). When the Q/D mode signal switches from H to L, i.e. when the mode is switched from Q to D, the detected current value IMD remains unchanged. Then, the P.I.D. control is conducted so that the difference between the target current value IMT and the detected current value IMD becomes zero (step 113), the duty value is decided (step 114), and the duty value is converted into a PWM signal. Lastly, the PWM signal, the motor driving direction decided in the step 103, and the Q/D mode signal are output (step 115).

Thus, the detected current correcting means 16 serving as the input signal correcting means corrects the motor current value detected by the current detecting circuit 5 in accordance with the duty value of the PWM signal, thereby ensuring high accurate correction. Even if the duty ratio changes at a fixed motor current due to the influences of the voltage generated by the revolution of the motor or the fluctuations in the voltage applied to the motor, the error in the detection performed by the current detecting circuit 5 serving as the current detecting means can be reduced.

The present invention can also be applied to a motor control unit which is not equipped with the motor driving mode switching means like the Q/D switching means 14.

Figure 5:
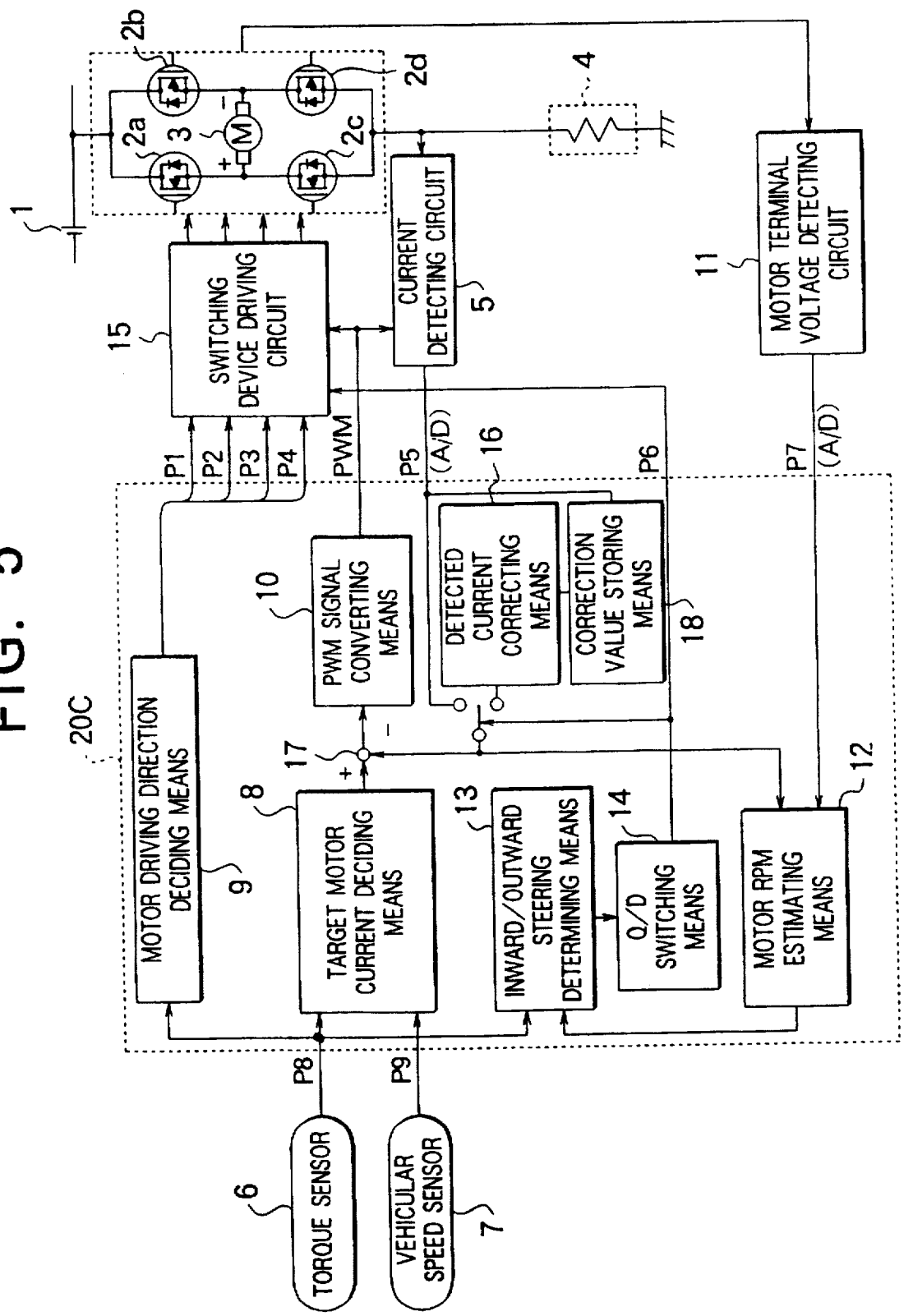
FIG. 5 is a block diagram illustrative of the configuration of an electric power steering control unit of a third embodiment according to the present invention.
Figure 6:
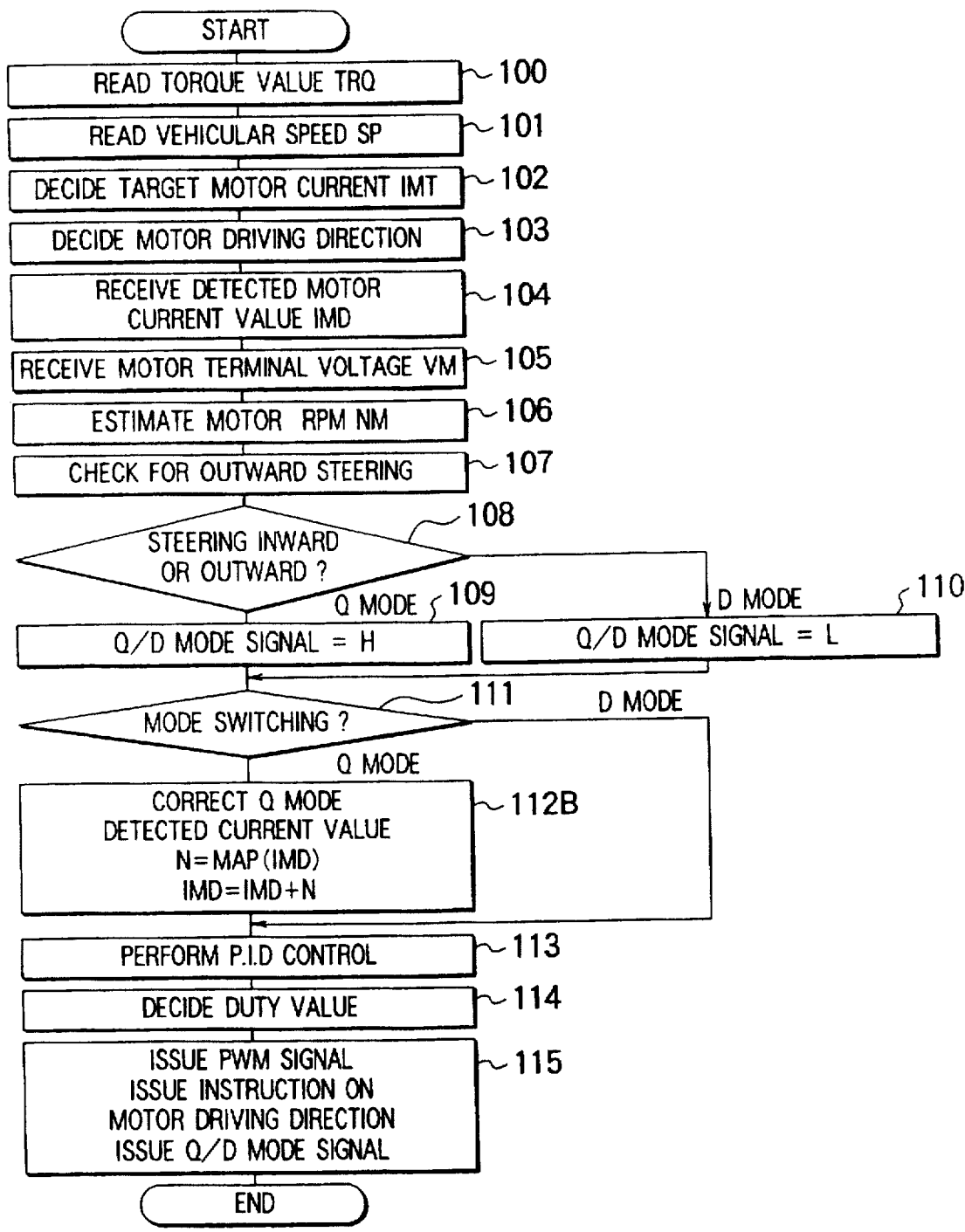
FIG. 6 is a flowchart illustrative of the operation of the control unit according to the third embodiment.

Third Embodiment:

FIG. 5 shows the configuration of the electric power steering control unit related to the third embodiment in accordance with the present invention; FIG. 6 is the flowchart showing the operation thereof. The third embodiment has a correction value storing means 18 which has been added to the detected current correcting means 16 of the electric power steering control unit shown in FIG. 1; the correction value storing means 18 maps and stores the predetermined correction value N to be added to the detected current value IMD. The rest of the configuration of this embodiment is identical to those of the first embodiment shown in FIG. 1; therefore, the detailed description thereof will be omitted.

The current control operation of a control unit 20C according to the embodiment will be described in conjunction with the flowchart of FIG. 6. The processing of up to the step 111 is the same as that of the first embodiment; therefore, it will be omitted. A step 112B indicates the switch of the Q/D mode signal from L to H, i.e. the switch from mode D to Q. The map of the correction value storing means 18 is referred to and the predetermined correction value N is determined according to the detected current value IMD, and the determined correction value N is added to the detected current value IMD to adjust it to the predetermined detected current value IMD. When the Q/D mode signal switches from H to L, i.e. when the Q mode switches to the D mode, the detected current value is used as IMD without correcting it. Then, the P.I.D. control is carried out so as to null the difference between the target current value IMT and the detected current value IMD (step 113), the duty value is decided (step 114), and the duty value is converted to a PWM signal. Lastly, the PWM signal, the motor driving direction determined in the step 103, and the Q/D mode signal (step 115) are output.

Figure 7:
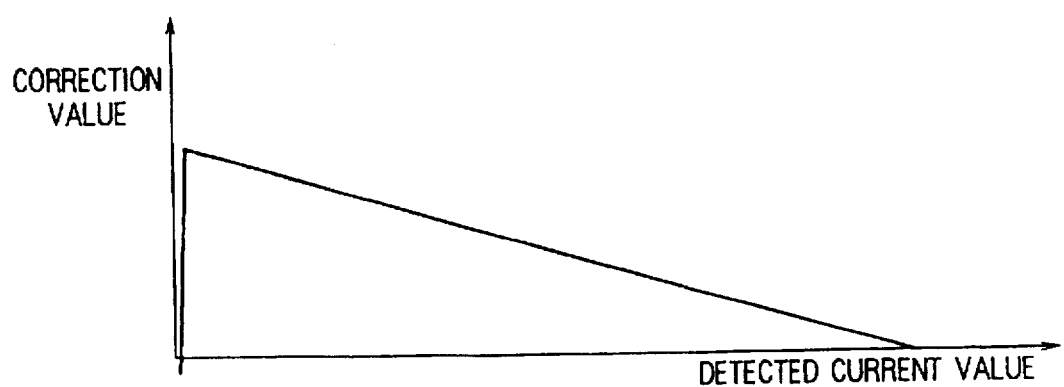
FIG. 7 is a map of correction value storing means of the third embodiment.

FIG. 7 shows an example of the map stored in the correction value storing means 18. In FIG. 7, the axis of abscissa indicates the detected current value IMD; the axis of ordinate indicates the corrected value N.

The contents of the map of the correction value storing means 18 are decided by the following input signal correcting means; therefore, they are effective also in the second embodiment described above.

Thus, the motor control units in the first and second embodiments described above are equipped with the correction value storing means for storing beforehand the correction values used by the input correcting means so that the input signal correcting means uses the correction values stored in the correction value storing means to accomplish correction. This permits easier corrective processing and eliminates the need of complicated arithmetic processing, resulting in a quicker correction processing. Hence, the motor control unit can be applied also to an inexpensive control unit (CPU) which does not have a built-in PWM output and a control unit (CPU) which is slow in arithmetic processing or which cannot allow much time for corrective processing. In the case of nonlinear correction values, the correction values can be set or updated more easily than in the arithmetic processing method.

Figure 8:
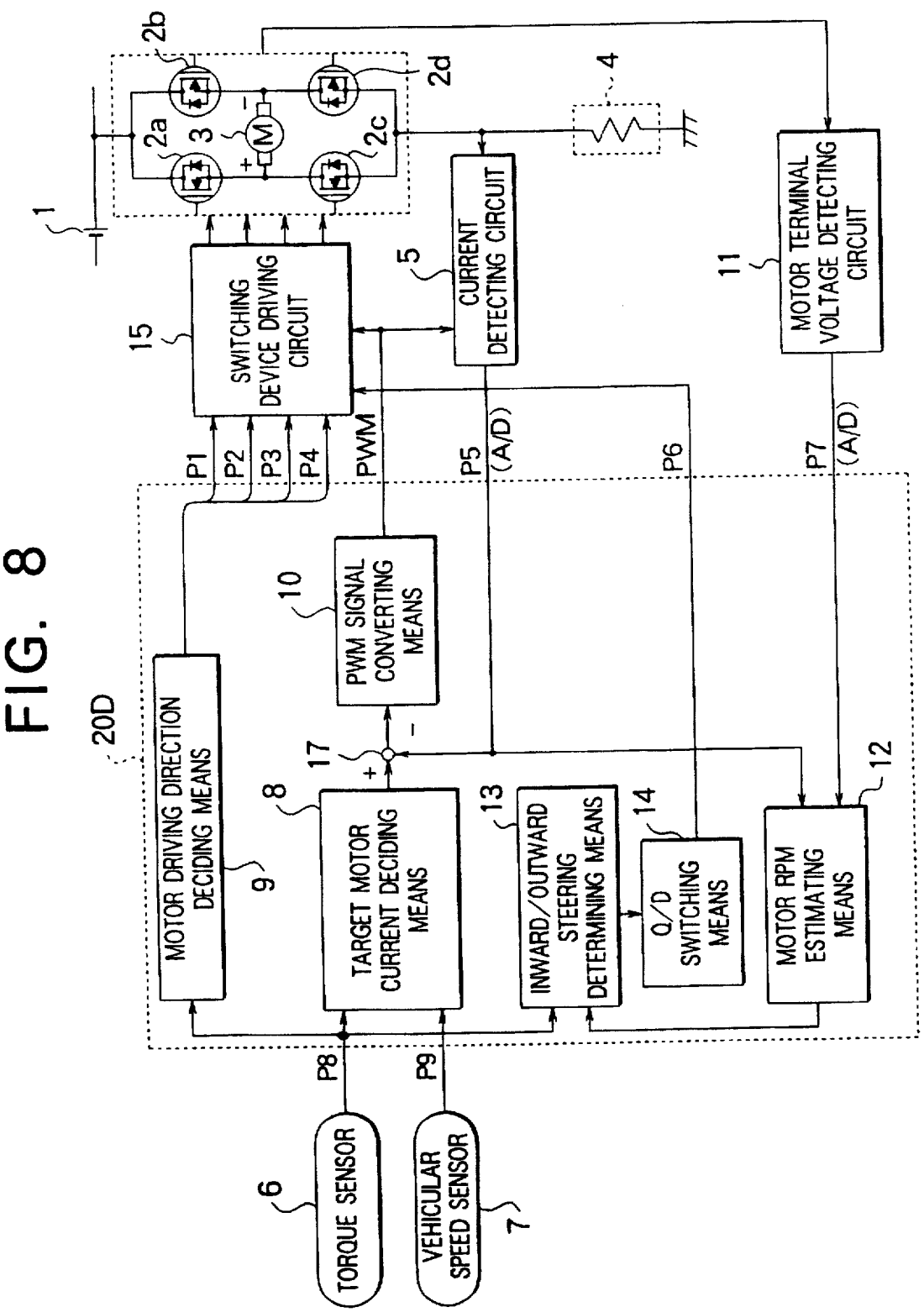
FIG. 8 is a block diagram illustrative of an electric power steering control unit of a fourth embodiment according to the present invention.
Figure 9:
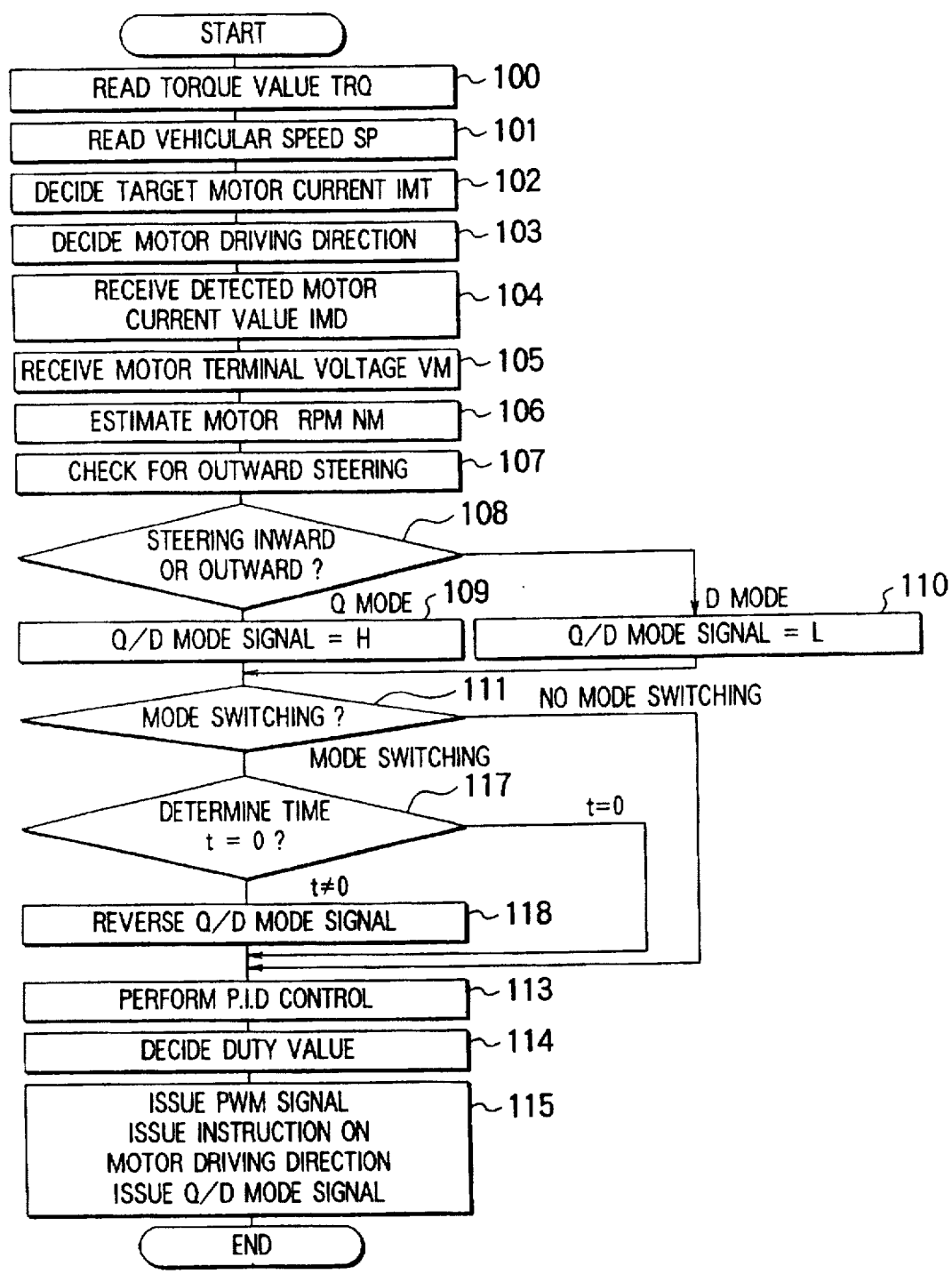
FIG. 9 is a flowchart illustrative of the operation of the control unit of the fourth embodiment according to the present invention.
Figure 10:
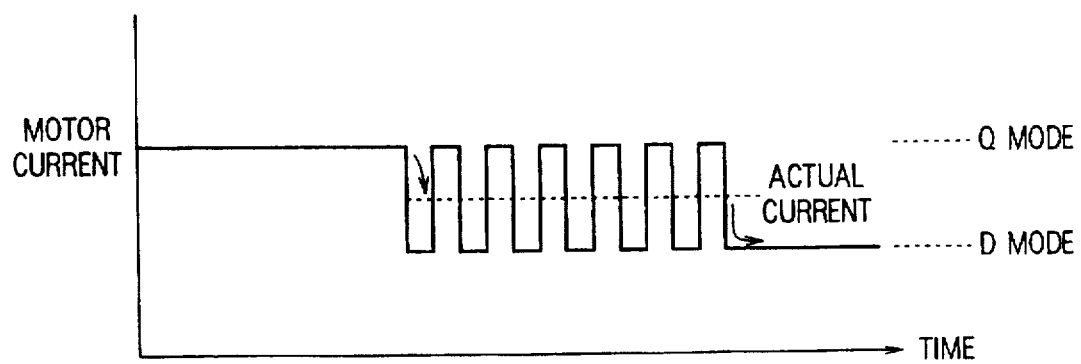
FIG. 10 is a characteristic diagram illustrative of the actual motor current of the fourth embodiment.
Figure 15:
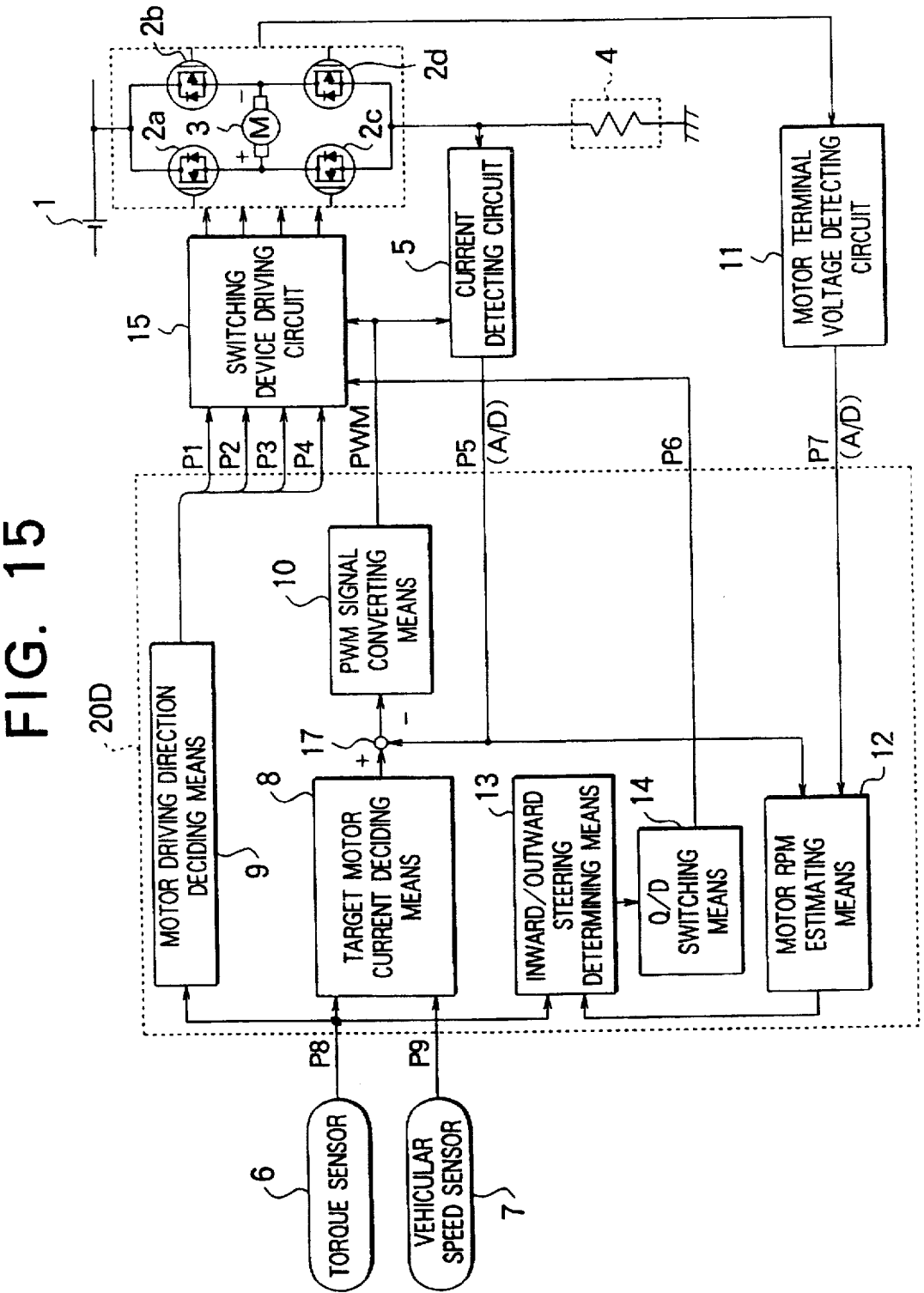
FIG. 15 is a block diagram illustrative of the configuration of a conventional electric power steering control unit.
Figure 16:
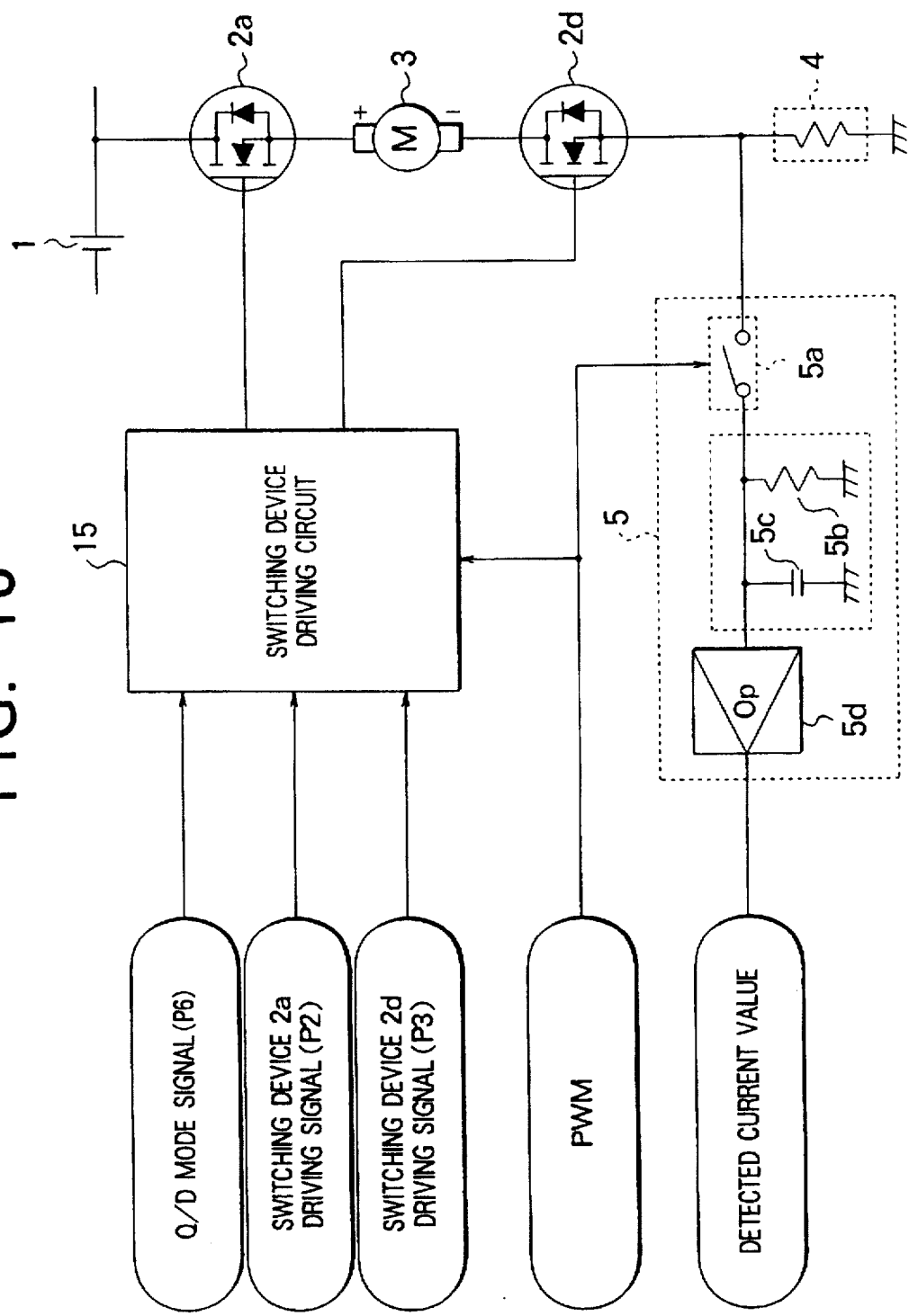
FIG. 16 is a circuit diagram illustrative of the configuration of current detecting means of FIG. 15.
Figure 17:
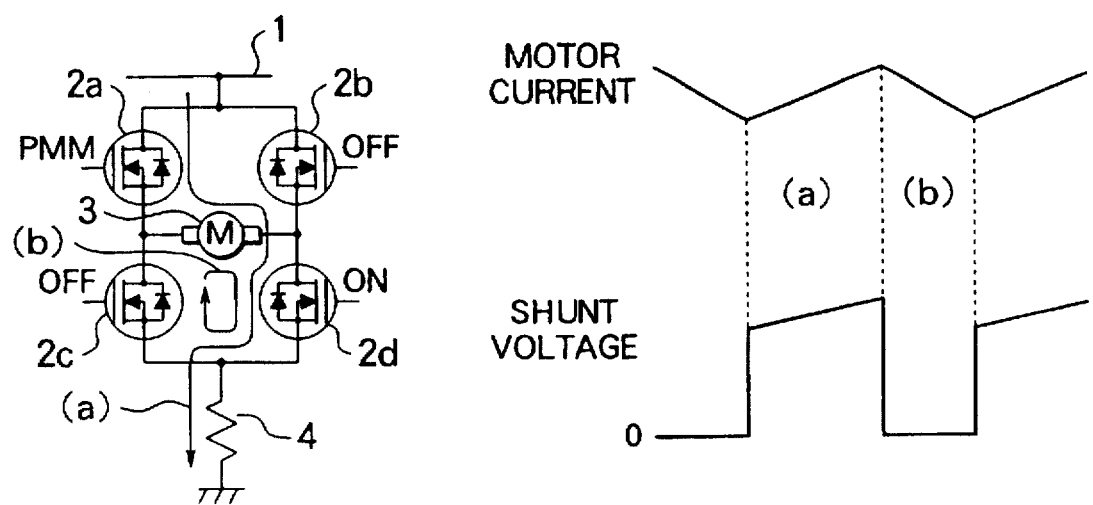
FIG. 17 is a circuit diagram illustrative of the flow of a motor current observed when the motor driving mode is switched to D.
Figure 18:
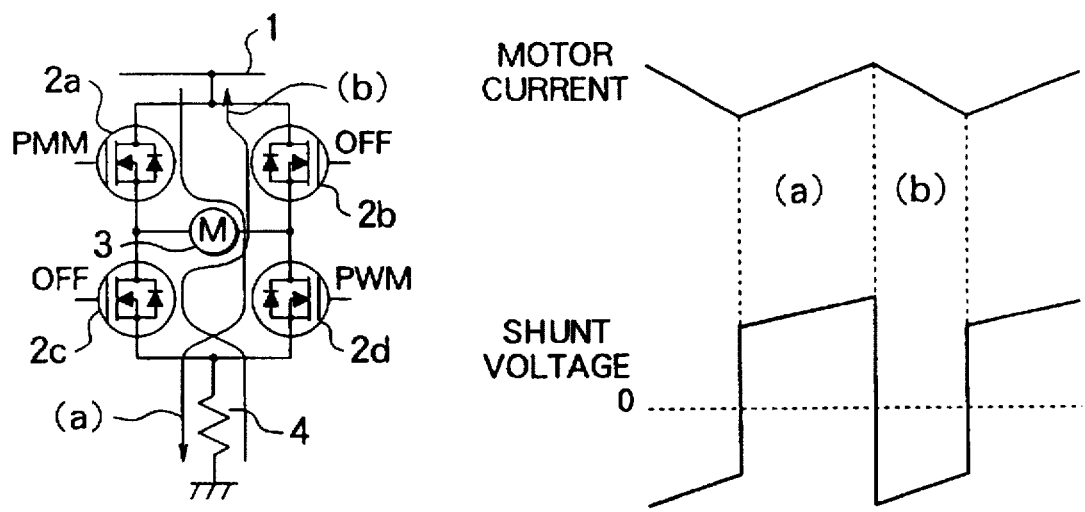
FIG. 18 is a circuit diagram illustrative of the flow of a motor current observed when the motor driving mode is switched to Q.
Figure 19:
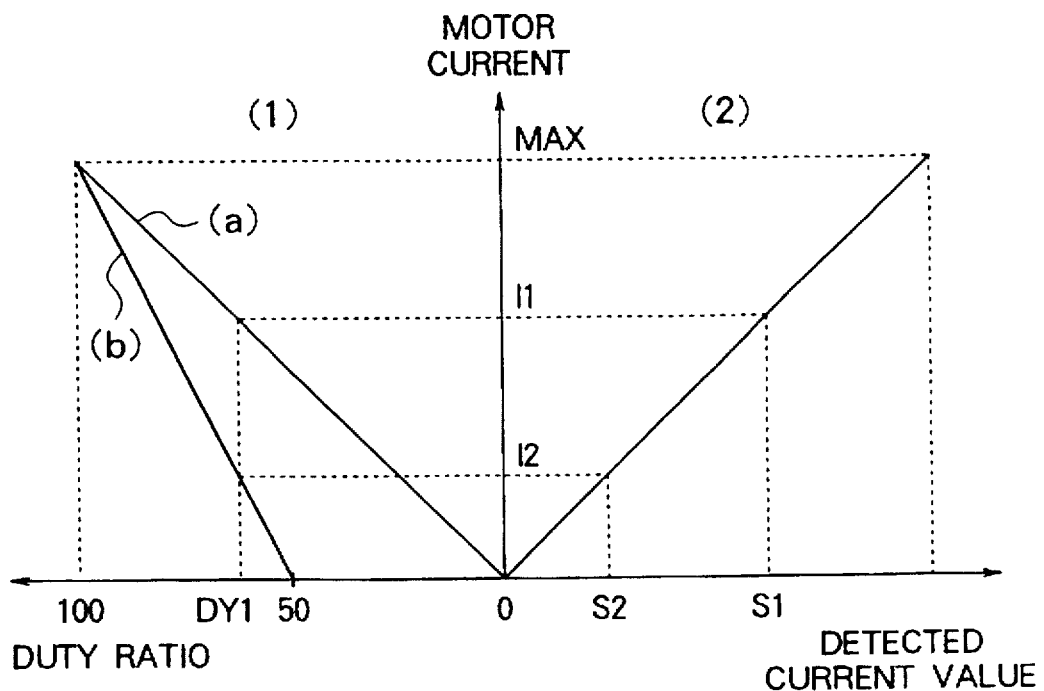
FIG. 19 is a characteristic diagram illustrative of the relationship between duty ratio, motor current, and detected current in the Q and D modes.
Figure 20:
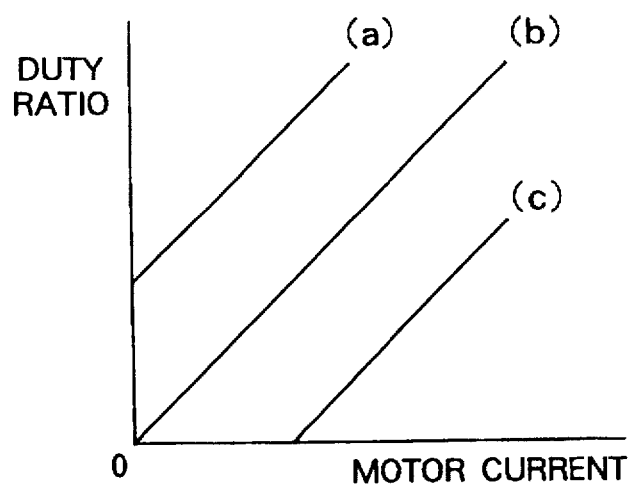
FIG. 20 is a characteristic diagram illustrative of the relationship between the motor current and the duty ratio when the motor is running.

Fourth Embodiment:

FIG. 8 shows the configuration of the electric power steering control unit related to the fourth embodiment in accordance with the present invention; FIG. 9 is the flowchart illustrative of the operation thereof. The configuration of the electric power steering control unit according to the fourth embodiment is almost the same as that of the conventional one shown as an example in FIG. 15 except that the control operation, i.e. the control program, of a control unit 20D is different.

The operation of the fourth embodiment will now be described with reference to the flowchart given in FIG. 9. The operation of up to the step 110 is identical to that of the first embodiment and therefore the description thereof will be omitted. In the step 111, it is determined whether the processing performed up to the step 110 has caused the Q/D mode signal to switch from L to H or from H to L. If it is determined that the motor driving mode has been switched, then it is checked whether a predetermined time has elapsed from the moment the motor driving mode was changed (t=0 means that the predetermined time has elapsed; t≠0 means that the predetermined time has not yet elapsed) (step 117). If it is determined that the predetermined time has not yet elapsed (t≠0), then the Q/D mode signal is reversed (step 118). If it is determined that the mode remains unchanged or that the predetermined time has elapsed (t=0), then the P.I.D. control is implemented to null the difference between the target current value IMT and the detected current value IMD (step 113), the duty value is decided (step 114), and the duty value is converted to a PWM signal. Lastly, the PWM signal, the motor driving direction decided in the step 103, and the Q/D mode signal are output (step 115).

Thus, whenever the motor driving mode is switched, the changeover between the two modes is alternately performed for the predetermined time. This makes it possible to reduce the fluctuations in the overall motor current and eliminates the need for the arithmetic formulas, map, data, or the like for making correction.

Furthermore, a predetermined frequency can be employed for alternately switching between the two driving modes, allowing the ratio of the two driving modes per cycle to be set to a predetermined value. When the frequency of the PWM signal is 20 kHz, setting the switching frequency to about 100 Hz permits reduced vibration and control noise at the time of switching.

Figure 11:
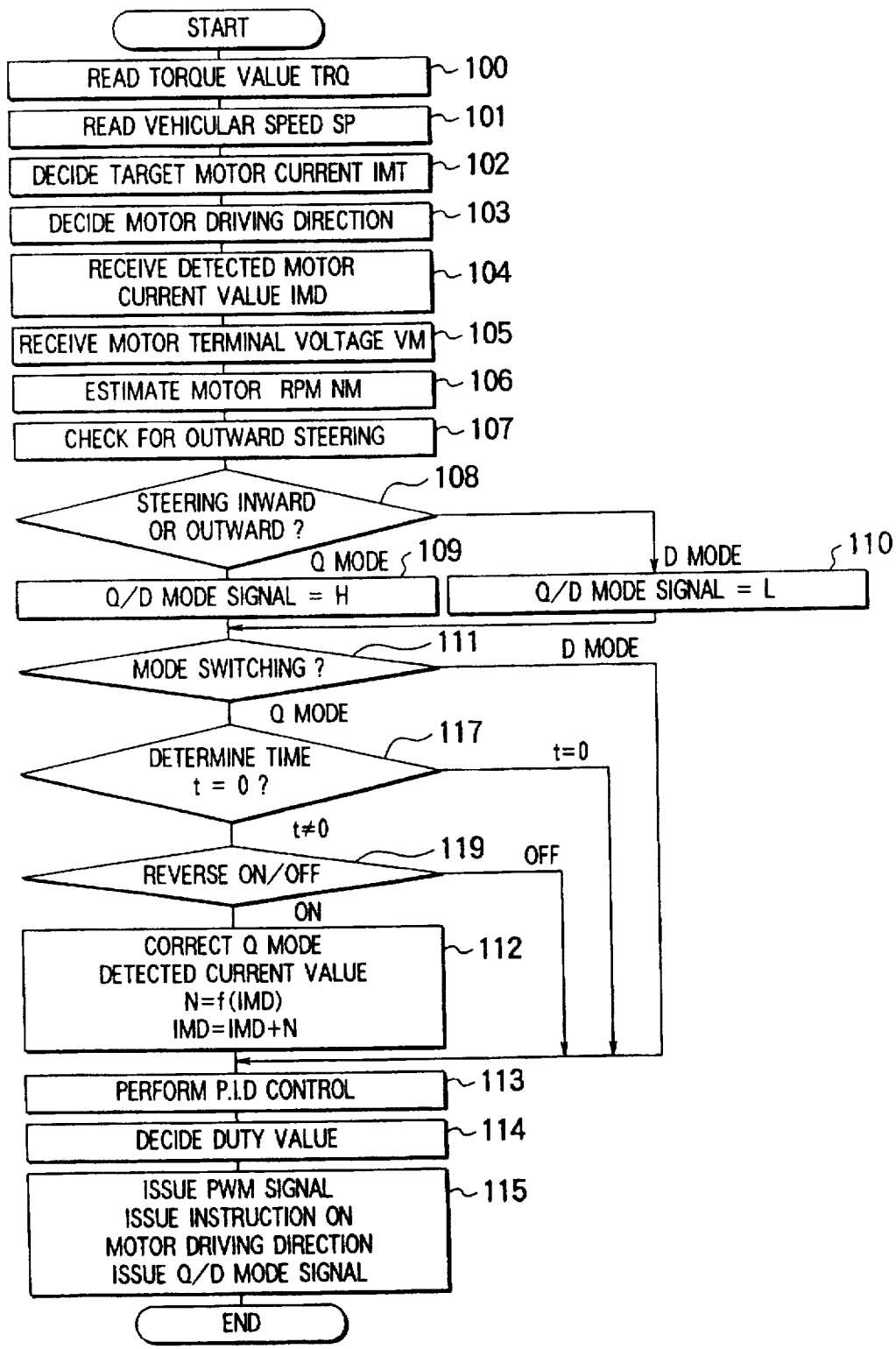
FIG. 11 is a flowchart illustrative of the operation of a control unit of a fifth embodiment according to the present invention.
Figure 12:
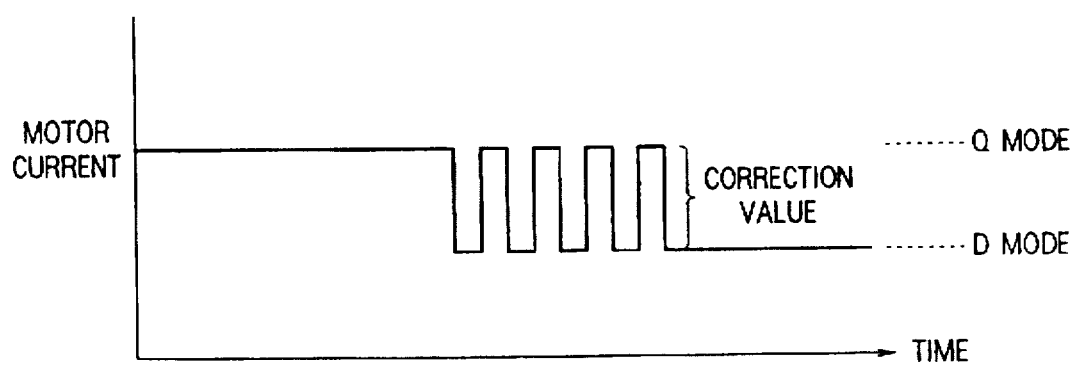
FIG. 12 is a characteristic diagram illustrative of the actual motor current of the fifth embodiment.

Fifth Embodiment:

FIG. 11 is the flowchart illustrative of the control operation of the electric power steering control unit related to the fifth embodiment according to the present invention. The configuration of the electric power steering control unit according to the fifth embodiment is the same as that shown in FIG. 1 except that the control operation, i.e. the control program, of the control unit (CPU) is different.

The operation of the fifth embodiment will now be described with reference to the flowchart given in FIG. 11. In FIG. 11, the operation of up to the step 111 is identical to that of the first embodiment of FIG. 2 and therefore the description thereof will be omitted. In the step 111, if the Q/D mode signal has switched from L to H, i.e. the mode D has been switched to Q, then it is checked whether a predetermined time has elapsed from the moment the mode was changed (step 117). If it is determined that the predetermined time has not yet elapsed (t≠0) and the ON/OFF of the corrective processing is reversed (step 119). This means that every time a step 119 is reached, it is determined whether the corrective processing should be implemented or not in the following step 112. In the step 112, the predetermined correction value N is determined according to the detected current value IMD and the determined correction value N is added to the detected current value IMD to adjust it to the predetermined detected current value IMD. If the Q/D mode signal has switched from H to L, i.e. if the mode has changed from Q to D, or if the predetermined time has elapsed (t=0) from the moment the mode was switched, and the reversal processing of a step 119 is OFF, then the detected current value is used as it is for the IMD. Then the P.I.D. control is implemented to null the difference between the target current value IMT and the detected current value IMD (step 113), the duty value is decided (step 114), and the duty value is converted to a PWM signal. In the last step, the PWM signal, the motor driving direction decided in the step 103, and the Q/D mode signal are output (step 115).

Thus, whenever the motor driving mode is switched, the corrective processing implemented by the input signal correcting means is repeatedly turned ON/OFF for the predetermined time, thus achieving reduced fluctuations in the overall motor current. Furthermore, the fluctuations in motor current can be reduced over the control range even if the voltage generated in either motor driving mode by a motor due to the outward steering leads to a range wherein the duty cannot be controlled.

Figure 13:
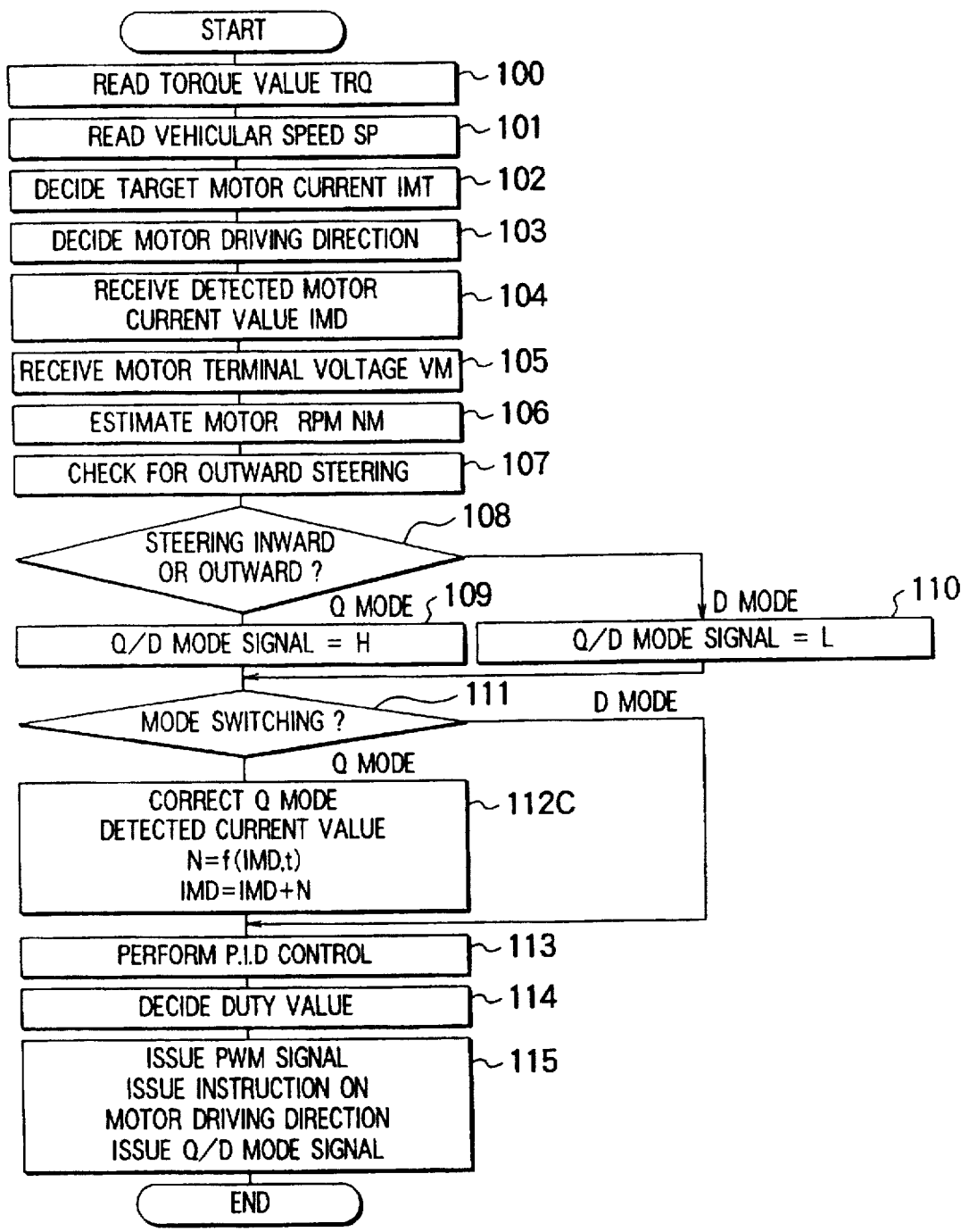
FIG. 13 is a flowchart illustrative of the operation of a control unit of a sixth embodiment according to the present invention.
Figure 14:
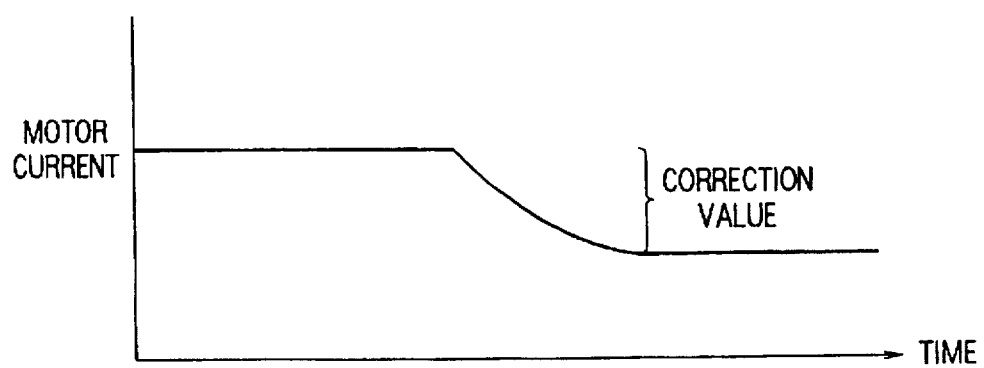
FIG. 14 is a characteristic diagram illustrative of the actual motor current of the sixth embodiment.

Sixth Embodiment:

FIG. 13 is the flowchart illustrative of the control operation of the electric power steering control unit related to the sixth embodiment according to the present invention. The configuration of the electric power steering control unit according to the sixth embodiment is the same as that shown in FIG. 1 except that the control operation, i.e. the control program, of the control unit (CPU) is different.

The operation of the sixth embodiment will now be described with reference to the flowchart given in FIG. 13. In FIG. 13, the processing of up to the step 111 is the same as that of the first embodiment and the description thereof will be omitted. If the processing implemented up to the step 111 causes the Q/D mode signal to switch from L to H, i.e. if mode D is switched to Q, then the predetermined correction value N is determined in accordance with the detected current value IMD and the determined correction value N is added to the detected current value IMD to adjust it to the predetermined detected current value IMD (step 112C). The correction value calculated in the step 112C is determined so that it decreases as time passes. When the Q/D mode signal switches from H to L, i.e. when the Q mode is switched to the D mode, the detected current value is used as it is for IMD. Then, the P.I.D. control is carried out so as null the difference between the target current value IMT and the detected current value IMD (step 113), the duty value is decided (step 114), and the duty value is converted to a PWM signal. Lastly, the PWM signal, the motor driving direction determined in the step 103, and the Q/D mode signal (step 115) are output.

Thus, in the motor control unit of the sixth embodiment described above, whenever the motor driving mode is switched, the mode of the input signal correcting means is switched and the correction value of the input signal correcting means is decreased as time elapses. This ensures freedom from a digital error, making it possible to reduce the fluctuations in the motor current and achieve faster processing. The feature is advantageous especially when quicker corrective processing is desirable in the overall current control processing.

The first through sixth embodiments refer to the cases wherein the present invention is applied to the electric power steering control unit; however, it is needless to say that the present invention can be applied also to other general motor control units which drive motors in the PWM mode and feedback-control the motor current. Further, the detected current correcting means 16 is provided for a single driving mode (Q mode); however, when the motor has two or three or more driving modes, the detected current correcting means 16 may be provided for each motor driving mode, or it may be provided for a multiple motor driving modes as necessary. In either case, a single output of the plurality of the detected current correcting means 16 is selectively supplied to the input signal comparing means 17 by the Q/D switching means 14. As an alternative, a single detected current correcting means 16 is provided for a plurality of motor driving modes so that the correction value of the detected current correcting means 16 is changed in accordance with the motor driving mode.

Thus, according to the present invention, the fluctuations in the motor current caused by switching between different motor driving modes can be reduced by changing the correction value of the input signal correcting means whenever the motor driving mode is changed; therefore, the change or shock in the motor torque caused by the switching of the motor driving mode can be eliminated.

The input signal correcting means permits further accurate correction by correcting at least one current input signal in the feedback control loop in accordance with the duty value of the PWM signal. Moreover, the error of the current detecting means can be reduced even if the duty ratio changes due to the voltage generated by the revolution of a motor or the fluctuations in the battery voltage.

Further, the correction value storing means for storing beforehand the correction values used by the input correcting means is provided so that the input signal correcting means uses the correction values stored in the correction value storing means to accomplish correction. This permits easier corrective processing and eliminates the need of complicated arithmetic processing, resulting in quicker corrective processing. Hence, the motor control unit can be applied also to an inexpensive control unit which does not have a built-in PWM output and a control unit which is slow in arithmetic processing or which cannot allow much time for corrective processing, thus permitting reduced cost of the unit. In the case of nonlinear correction values, the correction values can be set or updated more easily than in the arithmetic processing method.

Furthermore, whenever the motor driving mode is switched, the changeover between the two modes is alternately performed for the predetermined time, thereby enabling reduced fluctuations in the overall motor current. In addition, the control unit no longer requires the arithmetic formulas, maps, data, and the like for making correction and it can be applied directly to a conventional circuit configuration, resulting in lower cost. The vibration and control noise produced at the time of switching can be reduced by adjusting the frequency at which the switching between the two driving modes alternately is performed.

Whenever the motor driving mode is switched, the input correcting means repeatedly checks for the correction amount for the predetermined time, thus achieving reduced fluctuations in the overall motor current. In addition, the fluctuations in motor current can be reduced over the whole control range even if the voltage generated in either motor driving mode by a motor due to the outward steering develops a range wherein the duty cannot be controlled.

Whenever the motor driving mode is switched, the mode of the input signal correcting means is switched and the correction value of the input signal correcting means is decreased as time elapses. This ensures freedom from a digital error, making it possible to reduce the fluctuations in the motor current and permit faster processing. The feature is advantageous especially when quicker corrective processing is desirable in the overall current control processing.

What is claimed is:

1. A motor control unit for driving a vehicle power steering motor (3) with a PWM signal and feedback-controlling motor current, comprising:
   a) driving means (15) for driving said motor with a PWM signal;
   b) motor driving mode switching means (14) having a plurality of motor driving modes for a driving control system of said motor and for switching said motor driving mode;
   c) a feedback control loop coupled between the motor and the driving means, and including current detecting means (5) for detecting a drive current flowing through said motor, and comparing means (17) for comparing the detected motor current with a target motor current, and
   d) means for preventing shocks to a steering system of the vehicle and current detection errors due to motor driving mode switching, said preventing means comprising input signal correcting means (16) coupled in said feedback control loop for correcting at least one input signal of said comparing means in accordance with said motor driving mode; wherein the correction value given by said input signal correcting means is changed whenever said motor driving mode is switched.

2. A motor control unit for driving a vehicle power steering motor with a PWM signal and feedback-controlling motor current, comprising:
   a) driving means for driving said motor with a PWM signal;
   b) motor driving mode switching means (14) having a plurality of motor driving modes for a driving control system of said motor and for switching said motor driving mode;
   c) a feedback control loop coupled between the motor and the driving means, and including current detecting means (5) for detecting a drive current flowing through said motor and comparing means (17) for comparing the detected motor current with a target motor current, and
   d) means for preventing shocks to a steering system of the vehicle and current detection errors due to motor driving mode switching, said preventing means comprising input signal correcting means (16) coupled in said feedback control loop for correcting at least one input signal of said comparing means in accordance with the duty value of said PWM signal.

3. A motor control unit for driving a vehicle power steering motor (3) with a PWM signal and controlling the motor current by feedback, comprising:
   a) driving means (15) for driving said motor with a PWM signal;
   b) motor driving mode switching means (14) having a plurality of motor driving modes for a driving control system of said motor and for switching said motor driving mode;
   c) a feedback control loop coupled between the motor and the driving means, and including current detecting means (5) for detecting a drive current flowing through said motor, and comparing means (17) for comparing the detected motor current with a target motor current, and
   d) means for preventing shocks to a steering system of the vehicle and current detection errors due to motor driving mode switching, said preventing means comprising means for alternately switching between two driving modes for a predetermined time when said motor driving mode switching means switches the motor driving mode.

4. A motor control unit for driving a motor in a PWM mode and feedback-controlling motor current, comprising:
   driving means for driving said motor in the PWM mode;
   motor driving mode switching means which has a plurality of motor driving modes for the driving control system of said motor and which switches said motor driving mode; and
   input signal correcting means for correcting at least one input signal of comparing means provided in a feedback control loop in accordance with said motor driving mode; wherein the correction value given by said input signal correcting means is changed whenever said motor driving mode is switched,
   and further comprising correcting value storing means (18) for storing beforehand a correction value used by said input signal correcting means;
   wherein said input signal correcting means performs correction by using the correction values stored in said correction value storing means.

5. A motor control unit for driving a motor in a PWM mode and feedback-controlling motor current, comprising:
   driving means for driving said motor in the PWM mode;
   motor driving mode switching means which has a plurality of motor driving modes for the driving control system of said motor and which switches said motor driving mode; and
   input signal correcting means for correcting at least one input signal of comparing means provided in a feedback control loop in accordance with said motor driving mode; wherein the correction value given by said input signal correcting means is changed whenever said motor driving mode is switched, and
   the corrective processing implemented by said input correcting means is repeatedly turned ON/OFF for a predetermined time when said motor driving mode is switched by said motor driving mode switching means.

6. A motor control unit for driving a motor in a PWM mode and feedback-controlling motor current, comprising:
   driving means for driving said motor in the PWM mode;
   motor driving mode switching means which has a plurality of motor driving modes for the driving control system of said motor and which switches said motor driving mode; and
   input signal correcting means for correcting at least one input signal of comparing means provided in a feedback control loop in accordance with said motor driving mode; wherein the correction value given by said input signal correcting means is changed whenever said motor driving mode is switched, and
   the mode of said input signal correcting means is switched when the motor driving mode is switched by said motor driving mode switching means and the correction amount of said input signal correcting means is decreased as time passes.

* * * * *